(12) United States Patent
Lucas et al.

(10) Patent No.: US 6,598,388 B2
(45) Date of Patent: Jul. 29, 2003

(54) ENGINE EXHAUST GAS RECIRCULATION PARTICLE TRAP

(75) Inventors: Michael Lucas, Columbus, IN (US); Matthew Schneider, Columbus, IN (US); Louis P. Oldham, Greenwood, IN (US); Dean Dringenburg, Seymour, IN (US)

(73) Assignee: Cummins, Inc., Columbus, IN (US)

( * ) Notice: Subject to any disclaimer, the term of this patent is extended or adjusted under 35 U.S.C. 154(b) by 0 days.

(21) Appl. No.: 09/775,412

(22) Filed: Feb. 1, 2001

(65) Prior Publication Data

US 2002/0124553 A1 Sep. 12, 2002

(51) Int. Cl.⁷ .................................................. F01N 3/02
(52) U.S. Cl. ........................ 60/311; 60/278; 55/DIG. 30
(58) Field of Search ........................ 60/278, 279, 297, 60/311; 55/DIG. 30

(56) References Cited

U.S. PATENT DOCUMENTS

| | | | |
|---|---|---|---|
| 3,176,446 A | | 4/1965 | Siggelin |
| 4,179,892 A | | 12/1979 | Heydrich |
| 4,493,717 A | * | 1/1985 | Berger, Jr. et al. ............ 55/330 |
| 4,608,640 A | | 8/1986 | Shinzawa et al. |
| 4,867,634 A | * | 9/1989 | Baker et al. .................... 60/614 |
| 4,950,313 A | * | 8/1990 | Dullien et al. ......... 55/DIG. 25 |
| 4,974,117 A | | 11/1990 | Irwin |
| 5,013,340 A | | 5/1991 | Taslim et al. |
| 5,027,781 A | | 7/1991 | Lewis |
| 5,097,665 A | * | 3/1992 | Kammel ................. 55/DIG. 30 |
| 5,357,755 A | * | 10/1994 | Gillingham et al. .......... 60/311 |
| 5,390,492 A | | 2/1995 | Levendis |
| 5,426,936 A | * | 6/1995 | Levendis et al. ............. 60/311 |
| 5,440,880 A | | 8/1995 | Ceynow et al. |
| 5,458,664 A | | 10/1995 | Ishii et al. |
| 5,497,619 A | | 3/1996 | Yamada et al. |
| 5,505,174 A | | 4/1996 | Komoriya et al. |
| 5,592,925 A | * | 1/1997 | Machida et al. ............... 60/311 |
| 5,611,204 A | | 3/1997 | Radovanovic et al. |
| 5,732,688 A | | 3/1998 | Charlton et al. |
| 5,738,706 A | * | 4/1998 | Swanander et al. ............ 95/273 |
| 5,806,308 A | | 9/1998 | Khair et al. ................... 60/278 |
| 5,907,278 A | | 5/1999 | Park et al. |
| 5,927,075 A | * | 7/1999 | Khair ......................... 60/605.2 |
| 5,996,337 A | | 12/1999 | Blosser et al. |
| 6,009,704 A | | 1/2000 | Feucht |
| 6,013,118 A | | 1/2000 | Matsunuma et al. |
| 6,058,698 A | * | 5/2000 | Coral et al. .................... 60/311 |
| 6,062,026 A | | 5/2000 | Woollenweber et al. |
| 6,089,019 A | | 7/2000 | Roby et al. |
| 6,138,649 A | | 10/2000 | Khair et al. |
| 6,152,118 A | | 11/2000 | Sasaki et al. |
| 6,155,042 A | | 12/2000 | Perset et al. |

FOREIGN PATENT DOCUMENTS

| | | |
|---|---|---|
| DE | 1 122 498 | 1/1962 |
| EP | 0 232 688 A1 | 8/1987 |
| EP | 0 334 471 A2 | 9/1989 |
| WO | WO 94/08502 | 4/1994 |

* cited by examiner

*Primary Examiner*—Thomas Denion
*Assistant Examiner*—Diem T Tran
(74) *Attorney, Agent, or Firm*—Barnes & Thornburg (57) ABSTRACT

An exhaust gas recirculation system for an internal combustion engine includes intake and exhaust manifolds that respectively receive ambient air and expel exhaust gas. A recirculation line fluidly connects the exhaust and intake manifolds. An exhaust gas recirculation valve is included in the recirculation line and is controlled to distribute exhaust gas into the intake manifold. A particle trap is arranged to receive all of the exhaust gases from the exhaust manifold and includes a particle collection chamber therein. A stagnation region is provided within the particle trap such that all the exhaust gas passed through the exhaust gas particle trap is directed toward the stagnation region therein and at least a portion of debris carried with the exhaust gas is retained within the particle collection chamber.

23 Claims, 6 Drawing Sheets

ENGINE EXHAUST GAS RECIRCULATION PARTICLE TRAP

BACKGROUND OF THE INVENTION

The present invention concerns devices for reducing pollutants discharged by an internal combustion engine. More specifically, the invention relates to such devices adaptable to diesel engines which trap particles and vapor carried by the exhaust gas discharged from the engine.

It is recognized that the production of noxious oxides of nitrogen ($NO_x$) which pollute the atmosphere are undesirable. Steps are therefore typically taken to eliminate, or at least minimize, the formation of $NO_x$ constituents in the exhaust gas products of an internal combustion engine. The presence of $NO_x$ in the exhaust gas of internal combustion engines is generally understood to depend, in large part, on the temperature of combustion within the cylinders of the engine. In connection with controlling the emissions of such unwanted exhaust gas constituents from internal combustion engines, it is widely known to recirculate a portion of the exhaust gas back to the air intake portion of the engine (so-called exhaust gas recirculation or EGR). Since the recirculated exhaust gas effectively reduces the oxygen concentration of the combustion air, the flame temperature at combustion is correspondingly reduced, and since $NO_x$ production rate is exponentially related to flame temperature, such exhaust gas recirculation (EGR) has the effect of reducing the emission of $NO_x$.

It is further known to adapt the engine with electronic sensors to evaluate and control various operational parameters of the engine. One example includes providing a differential pressure transducer across an orifice to measure mass flow rate of the exhaust gas. Using this mass flow rate measurements of the exhaust gas, exhaust gas recirculation may be controlled to optimize engine performance and decrease emission levels. These sensors are typically placed in direct contact with the intake or exhaust gas which are often hostile to the electronic sensor itself. For example, the differential pressure sensor may be placed within the exhaust system that is in direct contact with debris laden exhaust gas.

Debris mixed with the exhaust gas includes particulate emissions can cause extensive damage to engines turbochargers or superchargers. Particulate debris is abrasive and enters the engine oil causing undue wear on the piston rings, valves, and other parts of the engine. A common form of particulate matter is "soot" which is a sticky substance that can lead to carbon build-up on surfaces exposed to the soot. The soot is particularly damaging to electronic sensors such as temperature and pressure sensors. Soot build-up on the sensor causes a degradation in sensor accuracy and in some instances permanent damage.

Figure 1:
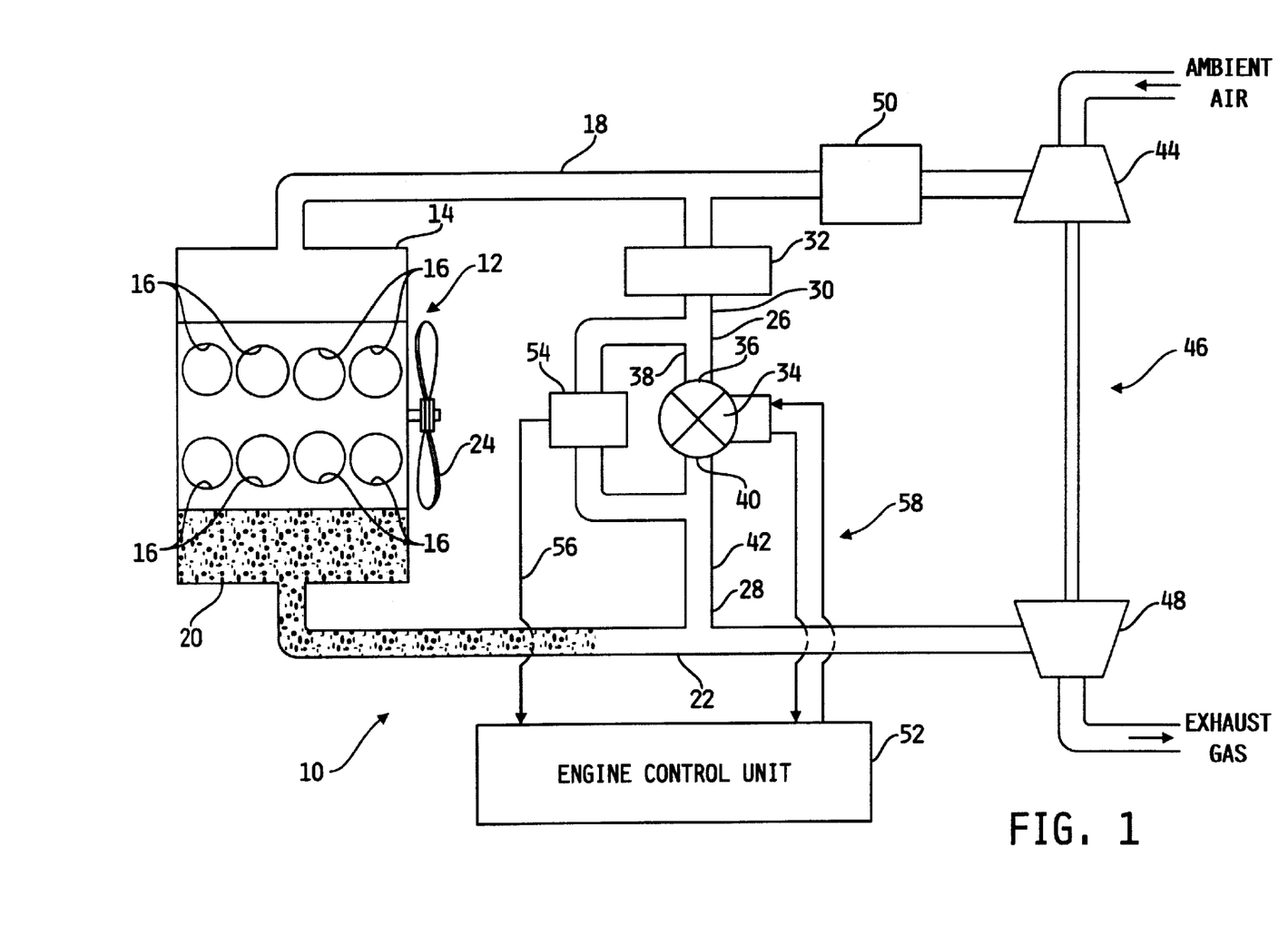
FIG. 1 is a schematic diagram of a typical known engine and exhaust gas recirculation system.

FIG. 1 depicts a typical engine and EGR system 10 including known components for actively controlling the mass flow of the recirculated exhaust gas. An internal combustion engine 12 includes an air intake manifold 14 attached to the engine 12 and coupled to the various cylinders 16 of the engine, typically through valves (not shown). Intake manifold 14 receives intake ambient air via conduit 18. An exhaust gas manifold 20 is attached to the engine 12 and coupled to the exhaust gas ports of the various combustion cylinders typically through valves (not shown). The exhaust manifold 20 exhaust combustion gas to the atmosphere via exhaust gas conduit 22. The engine 12 typically includes a fan 24 which is driven by the rotary motion of the engine to cool engine coolant fluid flowing through a radiator (not shown) positioned proximate the fan 24.

An exhaust gas recirculation line 26 is connected at one end 28 to the exhaust gas conduit 22, and at its opposite end 30 to an EGR cooler 32. The cooler 32 reduces the temperature of the exhaust gas in anticipation of re-entering the inlet air stream of conduit 18. An EGR flow control valve 34 is connected at one end 36 thereof to EGR cooler 32 via conduit 38, and at an opposite end 40 thereof to exhaust manifold 20 via conduit 42. The valve 40 is controllable to open or close the EGR path in response to engine performance requirements.

An air intake system (not shown) provides a supply of fresh intake air through a filter (not shown) to compressor 44 of a turbocharger 46. A first portion of the exhaust gas discharged from exhaust manifold 20 of engine 12 is supplied to intake conduit 18 through exhaust gas recirculating line 26 to combine with fresh air driven by the turbocharger compressor. A second portion of the exhaust gas flows through turbine 48 of turbocharger 46 to rotate compressor 44. As a result, intake air exiting from compressor 44 of turbocharger 46 is compressed and heated. The compressed intake air preferably flows through an intake air cooler 50 to reduce the air temperature to a level for optimum combustion in the engine cylinders. Intake air cooler 50 may be an air-to-air type heat exchanger, however, other types of diesel engine coolers or heat exchangers may be satisfactorily used. In operation, the EGR flow control valve 34 is controlled by an engine control module 52 (ECM) in response to differential pressure sensed through a pressure sensor 54 providing a pressure signal to the ECM 52, via signal path 56. The ECM 52 uses the differential pressure to calculate the mass flow rate of recirculated exhaust gas through valve 34. In response to the pressure signal, ECM 52 provides a corresponding control signal to EGR valve 34, through control circuit 58. Therefore, the EGR valve 34 is controlled via the ECM 52 to divert any desired amount of exhaust gas directly from the exhaust gas recirculation line 26 to intake conduit 18.

In one attempt to decrease particulate carried by the exhaust gas, devices referred to as "baghouses" have been employed to filter solid material carried by the exhaust gas. The baghouses can be provided with a fiber bag to capture debris with little on no exhaust gas backpressure. However, once a substantial amount of particulate is captured by the bag the device would lead to a detrimental increase in exhaust gas backpressure. This backpressure can result in a build up of debris within the exhaust system causing poor engine performance and ultimately failure of the engine.

Other known devices which decrease particulate emissions carried by the exhaust gas include regeneration devices which burn away the accumulation of debris. U.S. Pat. No. 5,390,492 to Levendis discloses a regeneration device for use with a filter assembly to decrease the particulate emission in the system. The regeneration device includes a collection chamber fitted with an electric powered incinerator to burn away material accumulating in the collection chamber. Unfortunately, the device is complicated and not a viable alternative for internal combustion engines utilizing after market equipment to decrease exhaust particulate. Furthermore, regeneration devices tend to be expensive to implement and are susceptible to malfunction.

U.S. Pat. No. 5,458,664 issued to Ishii et al. discloses a particle trap provided with a metallic mesh filter, the particle trap is placed directly in the exhaust gas line and is sized to avoid significant exhaust gas backpressure. However, the filter inherently accumulates debris and decreases the flow area, and consequently, an unwarranted back pressure develops. The backpressure in the exhaust line causes degradation of engine power and permanent engine damage, after a period of time.

What is therefore needed is a device for trapping debris in the form of exhaust gas particulate and vapor to protect equipment downstream and at the same time cause only insignificant restriction of exhaust gas from the engine. Moreover, a device that is inexpensive to manufacture and includes widespread adaptability to virtually all sizes and types of engines is desirable. Preferably, such a device should be serviceable rather than warranting periodic device replacement.

SUMMARY OF THE INVENTION

These unmet needs are addressed by the exhaust gas recirculation system of the present invention. In one aspect of the invention, an exhaust gas recirculation system for an internal combustion engine includes intake and exhaust manifolds to respectively receive ambient air and expel exhaust gas. A recirculation line fluidly connects the exhaust and intake manifolds. An exhaust gas recirculation valve is included in the recirculation line and is controlled to distribute exhaust gas into the intake manifold. A particle and/or vapor trap is arranged to receive all of the exhaust gas from the exhaust manifold and includes a particle collection chamber therein. A stagnation region is provided within the particle trap configured so that all the exhaust gas passing through the trap is directed toward the stagnation region therein and at least a portion of debris carried with the exhaust gas is retained within the particle collection chamber.

The present invention further provides a particle trap for an exhaust gas recirculation control system for use with an internal combustion engine including a housing having at least one inlet and at least one outlet. A flow deflector is included in the housing and is arranged to deflect a flow of exhaust gas discharged from the inlet. A stagnation region is provided within the housing and is in fluid communication with the inlet and is placed in relation to the flow deflector to receive all exhaust gas from the inlet. The stagnation region is in fluid communication with the outlet through an exhaust gas portal wherein substantially all of the flow of exhaust gas is directed toward the stagnation chamber to urge separation and collection of debris entrained in the exhaust gas.

In one aspect of the invention, the flow deflector is in fluid communication with an inlet cavity. The inlet cavity is in fluid communication with the stagnation region through an exhaust gas acceleration region to urge the flow of exhaust gas toward the stagnation chamber.

It is one object of the present invention to provide an exhaust gas recirculation system that receives substantially all of the exhaust gas expelled from the internal combustion engine such that debris carried by the exhaust gas is trapped and prevented from accumulating on operational sensors and the EGR valve.

Another object of the present invention is to provide a particle trap for an internal combustion engine which traps substantially all the debris, in the form of soot and vapor, expelled from the engine without a significant backpressure caused by the particle trap.

Yet another object is to provide a particle trap which may be readily integrated into new and existing internal combustion engines alike and one which is serviceable rather than requiring periodic replacement. Also, a particle trap which does not require electrical connection to operate and one which is inexpensive and not complicated to manufacture is desirous.

These and other objects, advantages and features are accomplished according to the systems and methods of the present invention, as described herein with reference to the accompanying figures.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrate embodiments of the invention and such exemplifications are not to be construed as limiting the scope of the invention in any manner.

DESCRIPTION OF THE PREFERRED EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. The invention includes any alterations and further modifications in the illustrated devices and described methods and further applications of the principles of the invention which would normally occur to one skilled in the art to which the invention relates.

The present invention provides an exhaust gas particle trap to divert and contain substantially all of the soot and vapor discharged by an internal combustion engine carried by the exhaust gas from the engine. The particle trap is preferably fitted within the exhaust line exiting the exhaust manifold to trap debris carried by the exhaust gas before such debris reaches the EGR valve and electronic equipment employed to efficiently operate, with environmental consciousness, an internal combustion engine.

Figure 2:
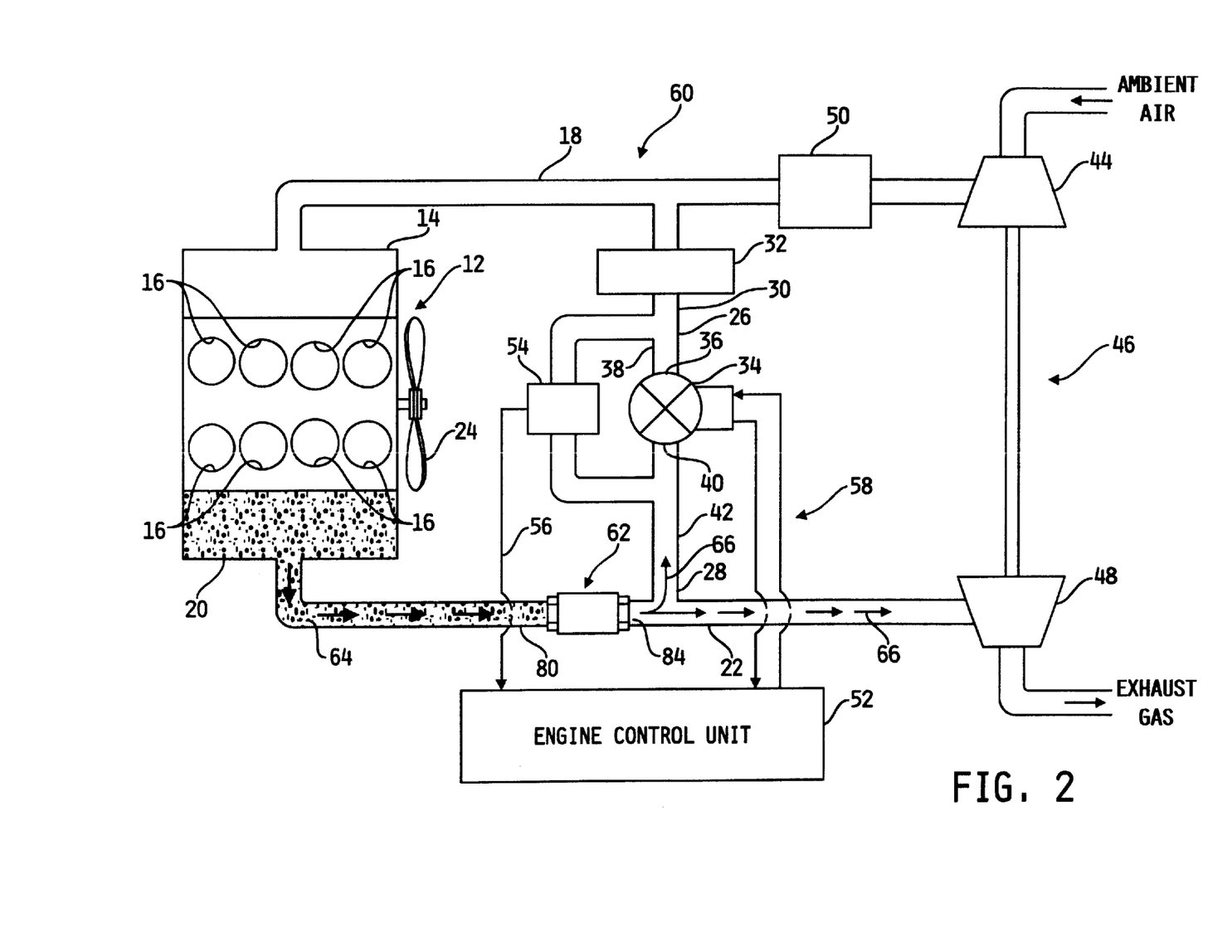
FIG. 2 is a schematic diagram of an exhaust gas recirculation system including a particle trap according to one embodiment of the present invention.

Referring to FIG. 2, an exhaust gas recirculation system 60 according to one embodiment of the present invention is shown. The system 60 differs from the known system 10 (FIG. 1) in that system 60 includes a particle trap 62 to contain debris 64 carried by the exhaust gas and provide exhaust gas that is substantially free of solid material.

Differential pressure sensor 54 is interposed in the EGR to aid in the control of the EGR valve 34. The sensor is typically a diaphragm type sensor, and is generally susceptible to performance degradation due to debris carried by the exhaust gas. The debris carried by the exhaust gas includes a sticky carbon rich substance which quickly accumulates and gums up equipment and narrows flow passages. The pressure sensor 54, and the remaining equipment positioned downstream relative to particle trap 62, are protected from debris discharged from the engine 12. Preferably, particle trap 62 is adapted to fit within exhaust gas conduit 22, connecting the exhaust manifold 20 and recirculation line 26. Notably, in this most preferred arrangement all the exhaust gas discharged from the exhaust manifold 20 is received by the particle trap 62.

Figure 3:
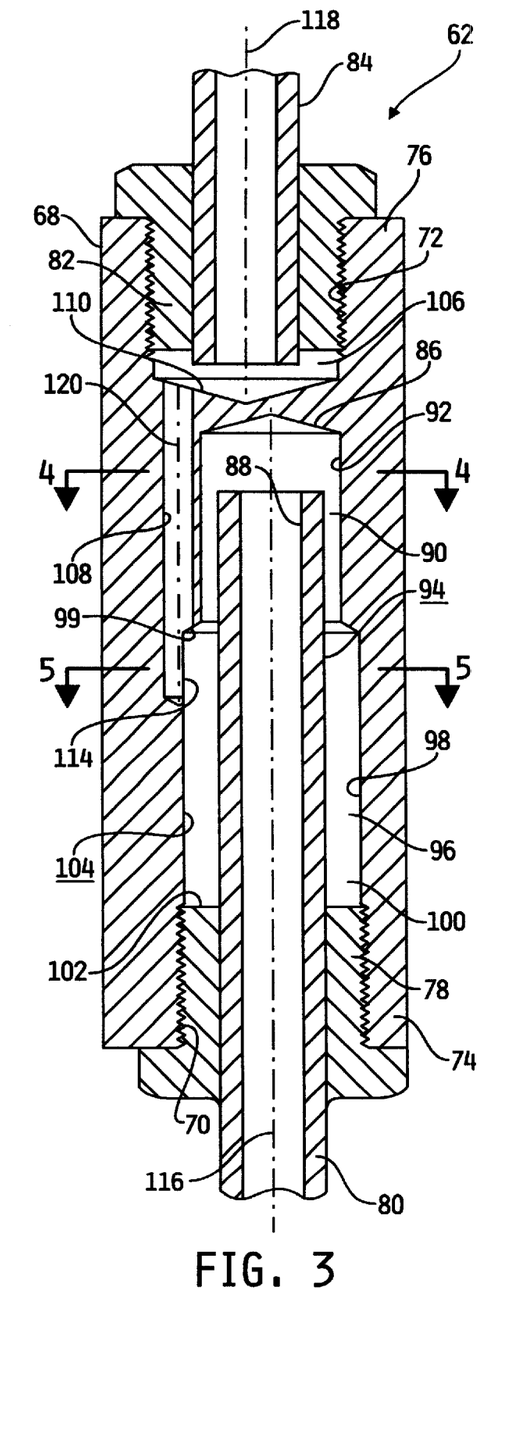
FIG. 3 is a side cross-sectional view of the particle trap depicted in FIG. 2.
Figure 4:
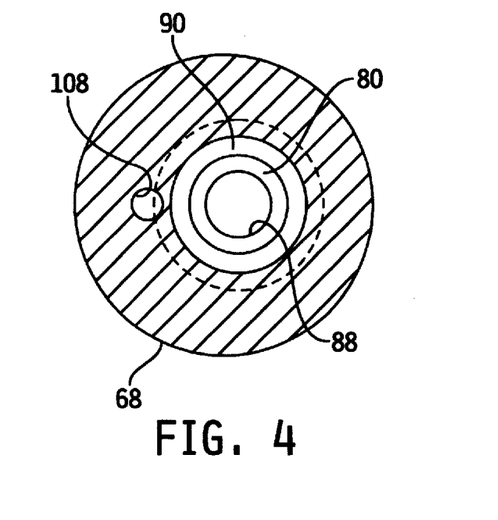
FIG. 4 is an end cross-sectional view of the trap shown in FIG. 3, taken along line 4—4, illustrating the connecting passageway and inlet cavity.
Figure 5:
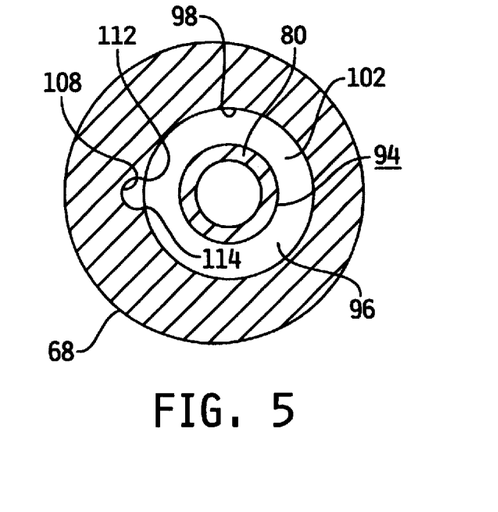
FIG. 5 is an end cross-sectional view of the particle trap shown in FIG. 3, taken along line 5—5, illustrating the exhaust gas portal.

Referring now to FIGS. 3–5, details of the structure of the particle trap 62 will be explained. Trap 62 includes a housing 68 with threaded ports 70, 72, respectively, provided on the opposite axial ends 74, 76 of housing 68. Axial end 74 of housing 68 receives threaded fitting 78 sealably connected with inlet conduit 80 through a pressure fit engagement, as is customary. Inlet conduit 80 is in direct fluid communication with the exhaust manifold 20 such that exhaust gas is transported from exhaust manifold 20 to particle trap 62 through inlet conduit 80 (FIG. 2).

Threaded port 72 of housing 68 threadably receives fitting 82 sealably connected with outlet conduit 84 through a pressure fit engagement. Outlet conduit 84 provides a discharge passage for cleaned exhaust gas to exit particle trap 62 and is fluidly connected with the turbine 48 and recirculation line 26 (FIG. 2). It is understood that other fittings can be utilized that are capable of achieving a fluid-tight connection of the trap between the conduits 80 and 84.

Housing 68 of particle trap 62 preferably includes a flow deflector 86 at the end of an inlet cavity 92 that is transversely positioned relative to inlet opening 88 of inlet conduit 80. Flow deflector 86 is provided to divert debris laden exhaust gas to a remote portion of the particle trap for further processing of the gas. Immediately downstream of flow deflector 86 is gas acceleration region 90. Acceleration region 90 is annular in shape and is located between inlet cavity 92 and an outer surface 94 of inlet conduit 80. Acceleration region 90 is provided immediately downstream from the flow deflector 86 to further guide the gas through the particle trap. Additionally, acceleration region 90 represents a decrease in flow area relative to the immediately preceding inlet cavity 92 consequently causing the exhaust gas to speed up through acceleration region 90. The moving exhaust gas exits acceleration region 90 having a significant velocity and is projected beyond exhaust gas portal 114 such that debris laden exhaust gas does not prematurely escape through the exhaust gas portal 114. Annular shaped stagnation region 96 is positioned downstream relative to acceleration region 90 and is located between counterbore 98 and outer surface 94 of inlet conduit 80. Funnel shaped transition portion 99 connects acceleration region 90 and stagnation region 96. Transition portion 99 includes an inner diameter that progressively increases from acceleration region 90 to stagnation region 96 and as a result exhaust gas flowing through transition portion 99 experiences a significant decrease in velocity. Stagnation region 96 is provided to significantly slow the exhaust gas discharged from acceleration region 90. Once slowed, the relatively heavy debris particles carried by the exhaust gas tend to attach to the walls of counterbore 98 while the exhaust gas remains diffuse. Particle collection chamber 100 is located between face surface 104 of counterbore 98 and outer surface 94 of inlet conduit 80. Transverse face 102 of threaded plug 78 provides a floor for particle collection chamber 100.

Axial end 76 of housing 68 includes an outlet cavity 106 in fluid communication with outlet conduit 84. Outlet cavity 106 and inlet cavity 92 communicate through a connecting passageway 108 provided in housing 68 (FIG. 4). Connecting passageway 108 extends from a transversely positioned floor 110 of outlet cavity 106 towards outer radial portion 112 of counterbore 98 (FIG. 5). As best seen in FIG. 5, an exhaust gas portal 114 is formed between the intersection of counterbore 98 and connecting passageway 108.

In the preferred embodiment of the invention, the centerline of inlet conduit 80 extends axially along a first reference axis 116 and the centerline of outlet conduit 84 extends along a second reference axis 118. First and second reference axes 116, 118 are arranged parallel relative to one another. Preferably the two axes are offset, although the present invention contemplates first and second reference axes 116, 118 being arranged such that they are coincident. A third reference axis 120 represents the centerline of connecting passageway 108 and is parallel relative to first reference axis 116 of inlet conduit 80. Third reference axis 120 may be offset a distance of 1.0 inch, for example, relative to first axis 116. For machining purposes, it is preferred that the axes 116 and 118 are offset a distance equal to the radius of the connecting passageways 108.

One advantage of trap 62 is that it may be inexpensively manufactured from bar stock. For example, housing 68 may be made from a piece of "off the shelf" cylindrical or hexagonal carbon steel bar stock. The threaded plugs 78, 82 may be selected from a variety of standard fittings such as NPT fittings. Moreover, the inlet and outlet conduits 80, 84 may be pressure fitted with their respective threaded plugs 78, 82 as is customary. It is contemplated that the threaded plugs should be reusable such that housing 68 may be removed, the debris accumulated therein extracted, and the housing then replaced as a course of periodic maintenance.

To manufacture housing 68 through machining operations only the axial ends 74, 76 of housing 68 need be accessed. Inlet cavity 92 and counterbore 98 of axial end 74 are machined. Similarly, inlet cavity 106 and connecting passageway 108 of axial end 76 are machined, the threads in each axial end 74, 76 may then be formed to substantially complete the housing. Specifically, outlet cavity 106 in housing 68 may be formed by drilling, for example using a 1.625 inch drill, boring into the housing 68, along second reference axis 118. The connecting passageway 108 may then be drilled using a 0.375 inch drill along third reference axis 120. The inlet cavity 92 may then be formed by drilling, using a 1.25 inch drill, along the first reference axis 116. The first reference axis 116 is offset 0.25 inch, relative to second reference axis 118, for example. Counterbore 98, may then be provided in housing 68 by drilling, using a 1.5 inch drill, for example along the first reference axis 116. Although the trap is most easily formed by machining, it is contemplated that housing 68, alternatively, may be a cast or forged component having cored internal passageways rather than drilled passageways to reduce labor costs corresponding to machining the housing.

Figure 6:
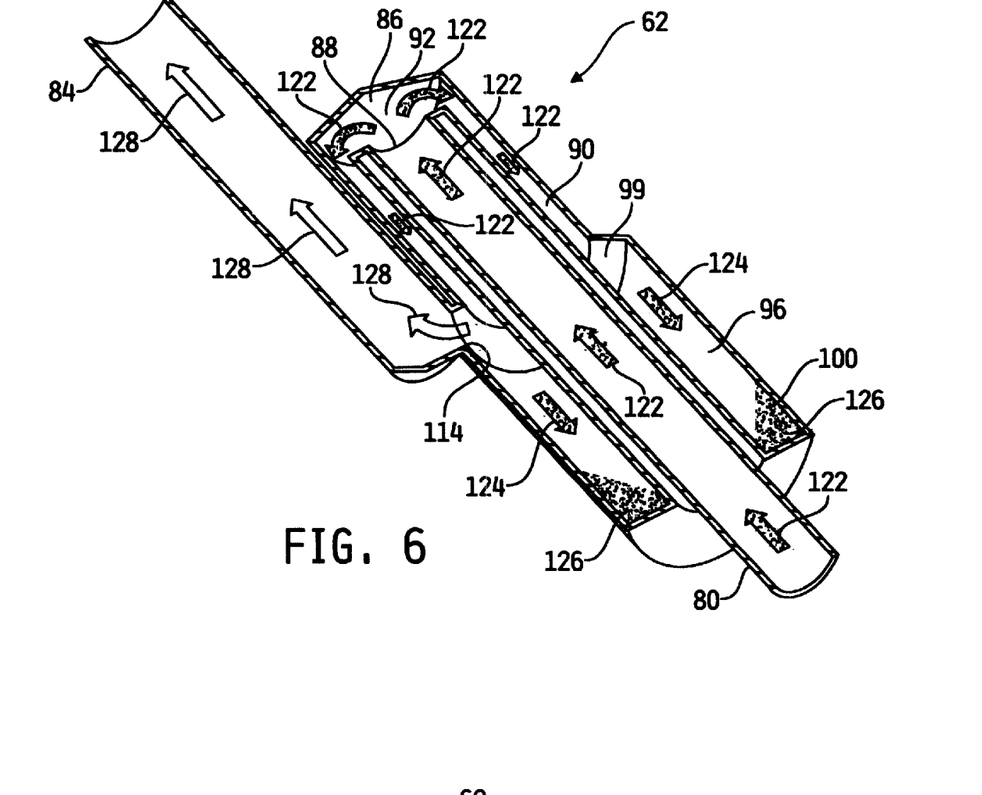
FIG. 6 is a perspective cross-sectional view of the particle trap of FIGS. 2–5, including a schematic diagram of the flow of exhaust gas and the trapping of particulate and vapor therein.
Figure 7:
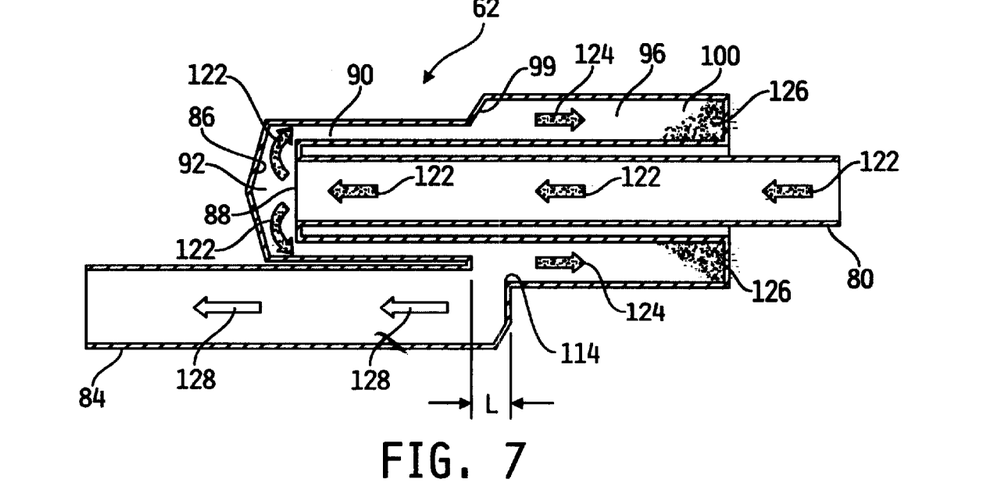
FIG. 7 is a plan view of the schematic flow diagram of FIG. 6, and further illustrating the length L of an exhaust gas portal of the inventive trap.

Referring to FIGS. 6 and 7, it may be seen that connecting passageway 108 intersects counterbore 98 to form the truncated cylindrical shaped exhaust gas portal 114. The flow characteristic of particle trap is, in part, dependent on the size of portal 114 which spans length "L" as best illustrated in FIG. 7.

In operation, exhaust gas carrying debris in the form of soot and vapor, illustrated by arrows 122, is discharged from inlet opening and strikes the flow deflector 86. The flow, laden with debris, is introduced into inlet cavity 92 and thereafter forced into the annular acceleration region 90. The debris carried with the exhaust gas is accelerated through the acceleration region 90 and directed toward stagnation region 96. As the flow transitions from acceleration region 90 to stagnation region 96 through transition portion 99, the flow expands and accordingly decreases in velocity. Once in the stagnation region, the debris 124 settles in the particle collection chamber 100. The debris 126 tends to separate from the gas when the combination is exposed to the stagnation region 96 and accumulates within the particle collection chamber 100. Thereafter, "cleaned" exhaust gas, as illustrated by arrows 128, is discharged through exhaust gas portal 114 and is eventually dispatched from particle trap 62 to turbine 48, EGR valve 34 and pressure sensor 54 as illustrated by arrows 66 (FIG. 2). The exhaust gas recirculation system 60, operating without the inventive particle trap 62 would lead to poor engine performance or premature failure resulting in costly repairs and equipment downtime.

Referring to FIG. 7, exhaust gas portal 114 is positioned axially adjacent the acceleration region 90, such that exhaust gas and debris is directed toward the stagnation region 96, before it is allowed to exit the exhaust gas portal 114. The acceleration region ensures that the debris laden exhaust gas is projected past the exhaust portal 114 so that the exhaust gas may be cleaned within the stagnation region prior to exiting through the exhaust gas portal 114.

The exhaust gas and debris carried therewith introduced into inlet conduit 80 enter as pressure pulses discharged from the engine 12 (FIG. 2) and the pressure pulses urge further circulation of the flow through particle trap 62. Thus, particle trap 62 may be oriented in a variety of positions and effectively trap debris. However, it may be seen that particle trap 62 is most effective if vertically oriented, whereby particle collection chamber 100 is arranged beneath flow deflector 86 such that gravity assists the debris toward particle collection chamber 100.

Figure 8:
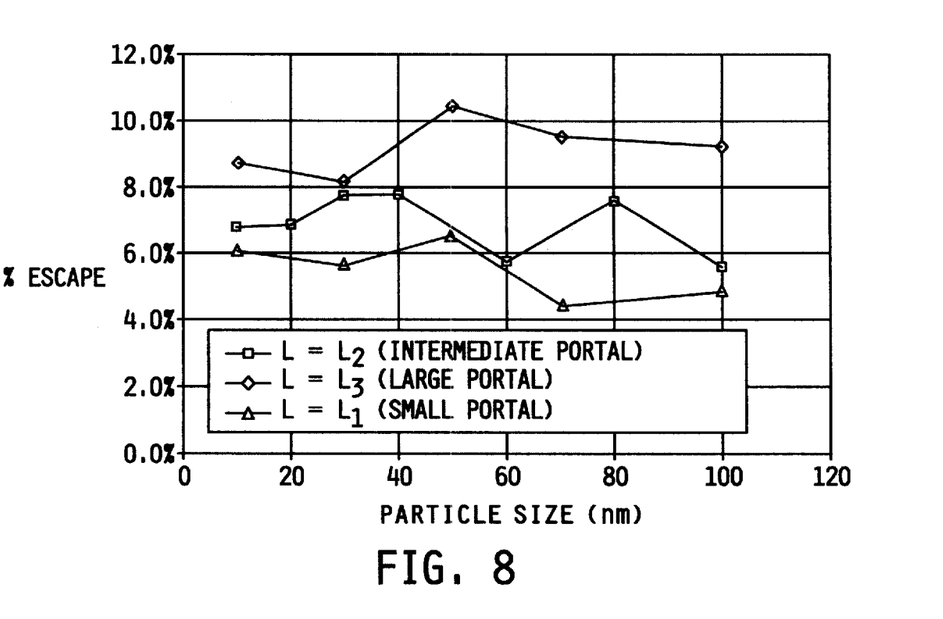
FIG. 8 is a graph depicting percent particle escape versus particle size for three differing particle trap assemblies according to the present invention.

Referring to FIG. 8, shown is particle retention data corresponding to three different particle trap constructions differing by the length L (FIG. 7) of exhaust gas portal 114. $L_1$ is the shortest length and is 1.75 inch, for example. $L_2$ and $L_3$ are 1.95 inch and 2.23 inch, respectively. Therefore, it may be seen that as the length of the exhaust gas portal is increased, i.e., as the flow area is increased, the percentage of total particulate debris allowed to escape through the portal increases for each portal dimension, the escape ratio for different particle sizes does not vary significantly.

Figure 9:
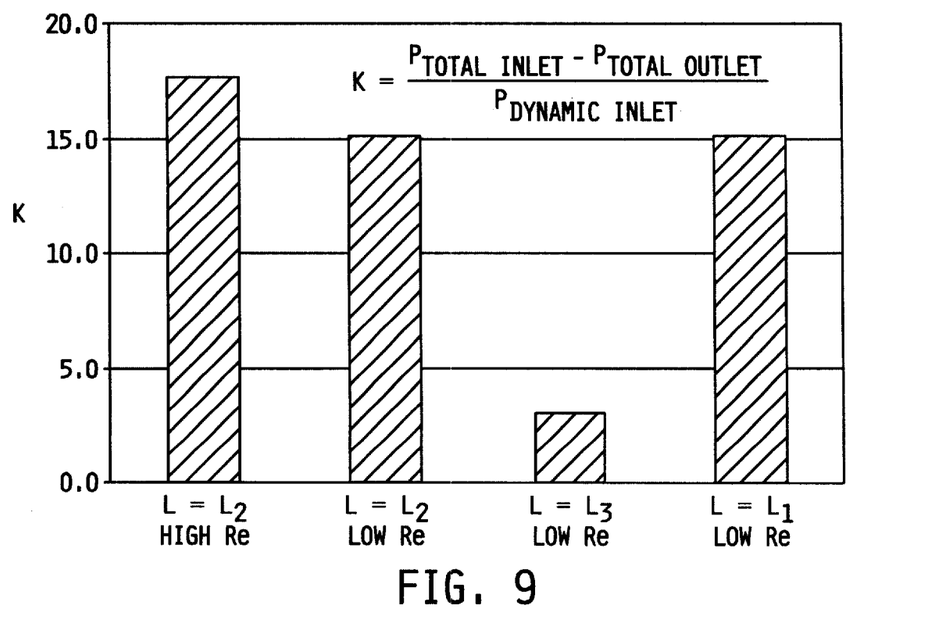
FIG. 9 is a graph depicting flow coefficients for the particle trap assemblies depicted in FIG. 8.

Referring to FIG. 9, a second graph is provided representing the flow characteristics for the particle trap structures having respective portal lengths $L_1$, $L_2$ and $L_3$. It is contemplated that flow through the particle trap 62 will coincide with relatively low flow rates, such as a flow having a Reynolds Number of 13,000. The data, illustrated in FIGS. 8 and 9, was collected at low flow velocity (Re 13,000) except for one instance wherein data was collected for a particle trap having the portal length $L_2$ at a high Reynolds Number (FIG. 9). It may be seen that the flow loss coefficient improves, (i.e., the particle trap causes less impedance to exhaust gas discharged from exhaust manifold 20 (FIG. 2)) as the length of the portal is increased. Portal length $L_3$ provides a significant improvement in flow over the particle trap having a portal length of $L_2$. Further, and with reference to FIG. 8, the percent of particle escape between the particle vapor traps having portal lengths $L_2$ and $L_3$ is not significantly different, yet a significant improvement in flow loss coefficient is provided by the trap having portal length $L_3$. The formula used to calculate each flow loss coefficient may be expressed as:

$$K_{Flow\ Loss\ Coefficient} = \frac{P_{Total\ Inlet} - P_{Total\ Outlet}}{P_{Dynamic\ Inlet}}$$

Figures 10, 11:
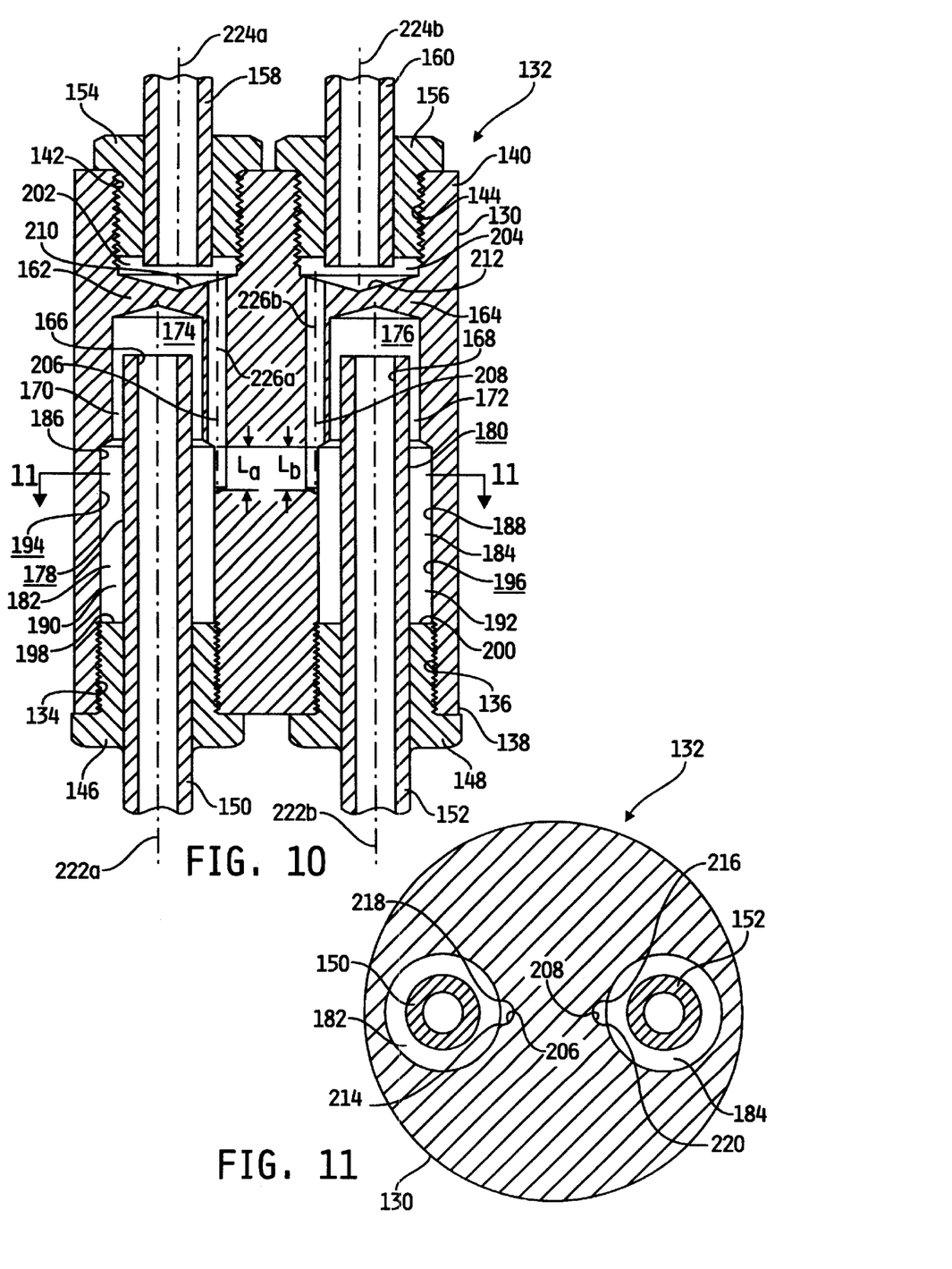
FIG. 10 is a side cross-sectional view of a second embodiment particle trap of according to the present invention.
FIG. 11 is a sectional view of the particle trap taken along line 11—11 of FIG. 10, illustrating the pair of exhaust gas portals.

A second embodiment of a particle trap is shown in FIG. 10 and differs from the first embodiment 62 by having a pair of particle traps combined in a single housing 130. Particle trap 132 includes housing 130 with threaded ports 134, 136 provided on axial end 138. The other axial end 140 of housing 130 includes threaded ports 142, 144. Axial end 138 of housing 130 receives threaded fittings 146, 148 sealably connected with inlet conduits 150, 152 through respective pressure fit engagements, as is customary. Inlet conduits 150, 152 are in direct fluid communication with the exhaust manifold such that exhaust gas is transported from the exhaust manifold to particle trap 132 through inlet conduits 150, 152. Threaded ports 142, 144 of housing 130 threadably receive fittings 154, 156 sealably connected with outlet conduits 158, 160 through pressure fit engagements. Outlet conduits 158, 160 provide discharge passages for clean exhaust gas to exit particle trap 132 and are fluidly connected with both the turbine and recirculation line. Therefore, cleaned exhaust gas is discharged from trap 132 and is introduced to the turbine, the EGR valve and pressure sensor without having soot and vapor carried by the exhaust gas.

Housing 130 of particle trap 132 includes a pair of flow deflectors 162, 164 that are transversely positioned relative to respective inlet openings 166, 168 of respective inlet conduits 150, 152. Immediately downstream of the flow deflectors 162, 164 are inlet cavities 174, 176 and gas acceleration regions 170, 172. Acceleration regions 170, 172 are annular in shape, and respectively located between inlet cavities 174, 176 and outer surfaces 178, 180 of inlet conduits 150, 152. Annular shaped stagnation regions 182, 184 are positioned downstream relative to acceleration region 170, 172 and are located between counterbores 186, 188 and outer surfaces 178, 180 of inlet conduits 150, 152. Particle collection chambers 190, 192 are located between wall surfaces 194, 196 of counterbores 186, 188 and outer surfaces 178, 180 of inlet conduits 150, 152. Transverse faces 198, 200 of threaded plugs 146, 148 provide respective floors for particle collection chambers 190, 192.

Axial end 140 of housing 130 includes outlet cavities 202, 204 in fluid communication with outlet conduit 158, 160. Outlet cavities 202, 204 and inlet cavities 174, 176 are in respective fluid communication through connecting passageways 206, 208 provided in housing 130. Connecting passageways 206, 208 respectively extend from transversely positioned floors 210, 212 of outlet cavities 202, 204 towards outer radial portions 214, 216 of counterbores 186, 188. Exhaust gas portals 218, 220 are formed between the respective intersections of counterbores 186, 188 and connecting passageways 206, 208 (FIG. 11).

In the preferred embodiment of the invention, the centerlines of inlet conduits 150, 152 extend axially along a pair of first reference axes 222a, 222b and the centerlines of outlet conduits 158, 160 extend along a pair of second reference axes 224a, 224b. First and second pairs of reference axes 222a, 222b, 224a, 224b are arranged parallel to one another. Preferably the two pair of axes are offset, although, it is envisioned that, alternatively, first and second pairs of reference axes 222a, 222b, 224a, 224b may be arranged such that each inlet conduit is axially aligned with each outlet conduit. A third pair of reference axes 226a, 226b represent the centerlines of connecting passageways 206, 208 and are preferably parallel relative to respective first pair of reference axes 222a, 222b of inlet conduits 150, 152. Each of the pair of third reference axes 226a, 226b may be offset relative to each respective first reference axis 222a, 222b a distance as that was previously described in accordance with the distance between axes 120 and 116 associated with particle trap 62, illustrated in FIG. 3. For machining purposes it is preferred that the pair of axes 222a, 222b are offset relative to axes 224a, 224b, by a distance equal to the radius of the respective connecting passageways 226a, 226b.

Particle trap 132 may be manufactured utilizing similar techniques and materials as previously described in association with particle trap 62 of the first embodiment. In order for exhaust gas to flow into intake conduits 158, 160, from the exhaust manifold a tee fitting (not shown) may be provided to accordingly divert the flow from the exhaust conduit, attached to the exhaust manifold, to the inlet conduits of the particle trap 132. Similarly, a tee fitting may be provided to transport cleaned exhaust gas away from the particle trap 132 through outlet conduits 158, 160.

In a preferred embodiment, the dimensions of each individual trap of the pair of traps illustrated are similar to the dimensions previously described in accordance with first embodiment particle trap 62. However, the present invention contemplates that the length of each exhaust gas portal $L_a$ and $L_b$ may be independently varied to provide an overall suitable particulate retention and flow loss coefficient for the particle trap 132.

While the invention has been illustrated and described in detail in the drawings and foregoing description, the same is to be considered as illustrative and not restrictive in character. It should be understood that only the preferred embodiments have been shown and described and that all changes and modifications that come within the spirit of the invention are desired to be protected.

For instance, it is understood that a vehicle engine and EGR system may be adapted with a particle trap having multiple stagnation chambers and associated collection chambers in a single housing such that adapting the trap to an exhaust system does not cause a significant backpressure of exhaust gas during extended use and concomitantly provides for a significant collective volume to retain trapped debris.

What is claimed is:

1. An exhaust gas particle trap for an internal combustion engine comprising:
    a housing defining an inlet configured for fluid coupling to an exhaust manifold of the engine to receive exhaust gas produced thereby, and an exhaust gas outlet;
    an acceleration region fluidly coupled to said inlet of said housing and configured to increase exhaust gas flow velocity therethrough; and
    an elongate chamber defining at one end an inlet receiving exhaust gas from said acceleration region, at an opposite end a debris receiving portion, and an exhaust gas portal therebetween fluidly coupled to said outlet of said housing, said portal positioned relative to the chamber inlet such that exhaust gas exiting said acceleration region is projected beyond said portal into said debris receiving portion where particles carried by the exhaust gas are collected before the exhaust gas exits said portal.

2. The exhaust gas particle trap of claim 1 wherein said exhaust gas portal defines a flow area sized to prevent excessive back pressure as the exhaust gas flows from said inlet to said outlet of said housing.

3. The exhaust gas particle trap of claim 1 wherein said housing includes a first conduit having a first end defining said inlet of said housing and a second opposite end;
    and further including a flow deflector adjacent to said second end of said first conduit, said flow deflector deflecting exhaust gas flowing through said first conduit into said acceleration region.

4. The exhaust gas article trap of claim 3 further including a second conduit having a first end defining said outlet of said housing and a second opposite end fluidly coupled by said exhaust gas portal to said chamber.

5. The exhaust gas particle trap of claim 4 wherein said exhaust gas portal extends transversely between said chamber and said second conduit.

6. The exhaust gas particle trap of claim 4 wherein said elongate chamber extends along a first axial reference and said second conduit extends along a second axial reference substantially parallel with said first axial reference.

7. The exhaust gas particle trap of claim 6 wherein said first axial reference is offset relative to said second axial reference.

8. The exhaust gas particle trap of claim 7 wherein said first conduit extends along a third axial reference substantially parallel with said first and second axial references.

9. The exhaust gas particle trap of claim 8 wherein said third axial reference is offset relative to said first and second axial references.

10. The exhaust gas particle trap of claim 1 wherein said acceleration region defines a first transverse flow area, and said chamber defines a second transverse flow area larger than said first transverse flow area.

11. The exhaust gas particle trap of claim 1 wherein the engine further includes an intake manifold and an exhaust gas recirculation conduit fluidly coupled between said exhaust manifold and said intake manifold, the exhaust gas particle trap disposed in-line between said exhaust manifold and said exhaust gas recirculation conduit.

12. An exhaust gas particle trap for an internal combustion engine comprising:
    a housing having a first conduit having a first end defining an inlet configured for receiving exhaust gas produced by the engine and a second opposite end defining an outlet, and a second conduit having a first end defining an exhaust gas outlet of the particle trap and a second opposite end;
    a flow deflector adjacent to said second end of said first conduit and operable to deflect exhaust gas flowing through said first conduit; and
    an elongate chamber defining at one end an inlet receiving exhaust gas deflected by said flow deflector, at an opposite end a debris receiving portion, and an exhaust gas portal therebetween fluidly coupling said chamber to said second end of said second conduit, said portal positioned relative to said chamber inlet such that exhaust gas entering said chamber inlet is projected beyond said portal into said debris receiving portion where particles carried by the exhaust gas are collected before the exhaust gas exits said portal.

13. The exhaust gas particle trap of claim 12 wherein said exhaust gas portal defines a flow area sized to prevent excessive back pressure as the exhaust gas flows from said inlet to said outlet of said housing.

14. The exhaust gas particle trap of claim 12 further including an acceleration region disposed between said flow deflector and said inlet of said chamber, said acceleration region increasing exhaust gas flow velocity from said first conduit into said chamber.

15. The exhaust gas particle trap of claim 14 wherein said exhaust gas portal extends transversely between said chamber and said second conduit.

16. The exhaust gas particle trap of claim 12 wherein said elongate chamber extends along a first axial reference and said second conduit extends along a second axial reference substantially parallel with said first axial reference.

17. The exhaust gas particle trap of claim 16 wherein said first axial reference is offset relative to said second axial reference.

18. The exhaust gas particle trap of claim 17 wherein said first conduit extends along a third axial reference substantially parallel with said first and second axial references.

19. The exhaust gas particle trap of claim 18 wherein said third axial reference is offset relative to said first and second axial references.

20. The exhaust gas particle trap of claim 14 wherein said acceleration region defines a first transverse flow area, and said chamber defines a second transverse flow area larger than said first transverse flow area.

21. The exhaust gas particle trap of claim 12 wherein the engine further includes an intake manifold and an exhaust gas recirculation conduit fluidly coupled between said exhaust manifold and said intake manifold, the exhaust gas particle trap disposed in-line between said exhaust manifold and said exhaust gas recirculation conduit.

22. An exhaust gas particle trap for an internal combustion engine comprising:
  a housing having a first conduit having a first end defining an inlet configured for receiving exhaust gas produced by the engine and a second opposite end defining an outlet, said first conduit extending along a first axial reference, and a second conduit having a first end defining an exhaust gas outlet of the particle trap and a second opposite end, said second conduit extending along a second axial reference;
  a flow deflector adjacent to said second end of said first conduit and operable to deflect exhaust gas flowing through said first conduit;
  an acceleration region fluidly coupled to said flow deflector and configured to increase exhaust gas flow velocity therethrough; and
  an elongate chamber extending along a third axial reference, with said first, second and third axial references substantially parallel and offset relative to each other, said chamber defining at one end an inlet receiving exhaust gas from said acceleration region, at an opposite end a debris receiving portion, and an exhaust gas portal therebetween extending transversely between said chamber and said second end of said second conduit, said portal positioned relative to the chamber inlet such that exhaust gas exiting said acceleration region is projected beyond said portal into said debris receiving portion where particles carried by the exhaust gas are collected before the exhaust gas exits said portal.

23. The exhaust gas particle trap of claim 22 wherein the engine further includes an intake manifold and an exhaust gas recirculation conduit fluidly coupled between said exhaust manifold and said intake manifold, the exhaust gas particle trap disposed in-line between said exhaust manifold and said exhaust gas recirculation conduit.

* * * * *